United States Patent [19]

Will et al.

[11] 3,879,220
[45] Apr. 22, 1975

[54] SEALED PRIMARY SODIUM-HALOGEN CELL

[75] Inventors: Fritz G. Will, Scotia; Gregory C. Farrington, Clifton Park, both of N.Y.

[73] Assignee: General Electric Company, Schenectady, N.Y.

[22] Filed: Mar. 21, 1974

[21] Appl. No.: 453,282

[52] U.S. Cl............................................. 136/83 R
[51] Int. Cl. .......................................... H01m 13/00
[58] Field of Search ......... 136/83 R, 100, 20, 6 LN, 136/6 FS, 153, 6 R

[56] References Cited
UNITED STATES PATENTS

| | | | |
|---|---|---|---|
| 3,703,415 | 11/1972 | Mitoff et al. | 136/83 R |
| 3,730,771 | 5/1973 | Tannenberger et al. | 136/6 R |
| 3,762,955 | 10/1973 | Dubin | 136/83 R |
| 3,773,558 | 11/1973 | Charbonnier et al. | 136/100 R |
| 3,793,080 | 2/1974 | Hess | 136/83 R |
| 3,817,790 | 6/1974 | Mitoff | 136/83 R |

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A sealed primary sodium-halogen cell is disclosed which comprises a casing, an anode positioned in the casing, the anode selected from the class consisting of sodium, sodium as an amalgam, and sodium in a non-aqueous electrolyte, a solid ion-conductive electrolyte positioned in the casing adjacent the anode, and a cathode positioned adjacent the opposite side of the electrolyte, the cathode comprising a halogen selected from the class consisting of bromine, iodine and mixtures thereof in a solvent of nitrobenzene. Electronically conductive material, small amounts of ionic salts or a combination of both are added to increase further the cell conductivity.

6 Claims, 1 Drawing Figure

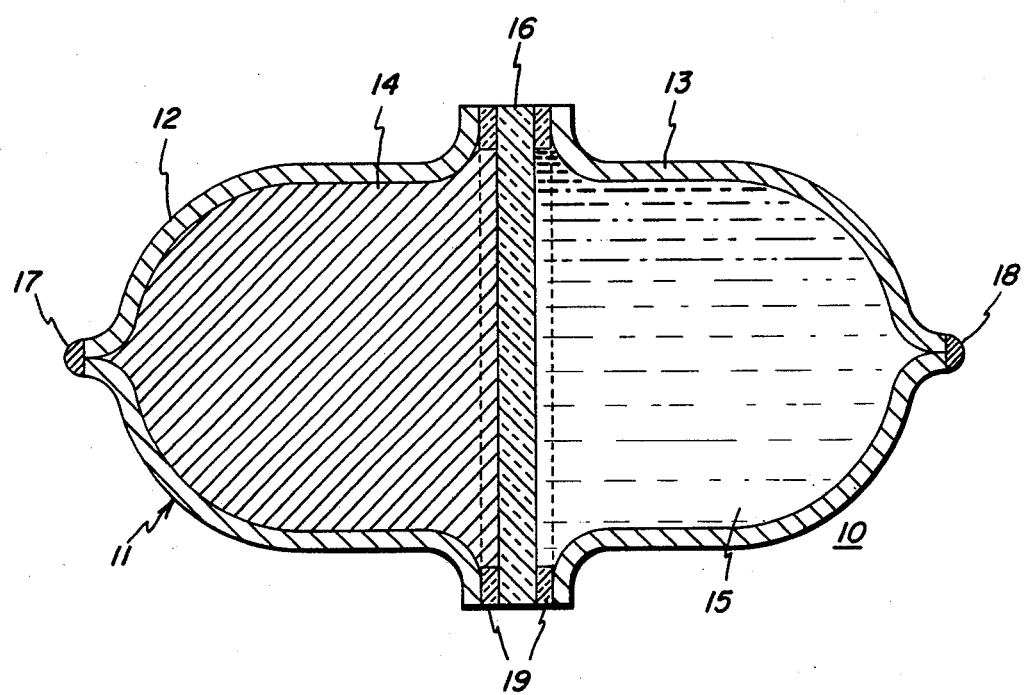

SEALED PRIMARY SODIUM-HALOGEN CELL

This invention relates to sealed primary sodium-halogen cells and, more particularly, to such cells employing a cathode of a halogen in a solvent of nitrobenzene.

Sealed sodium-halogen cells are known in the prior art as, for example, described in U.S. Pat. No. 3,793,080 issued Feb. 19, 1974 under the title "Sealed Primary Sodium-Halogen Battery With Bromine-Iodine Mixture." This patent describes and claims such a battery in which the cathode comprising a mixture of bromine and from 5.0 to 60 weight percent of iodine with specific conductive material, additives or both. The subject patent is assigned to the same assignee as the present application.

The primary object of our invention is to provide a primary battery which has a near zero self-discharge rate, high cell voltage and high energy density.

In accordance with one aspect of our invention, a sealed primary sodium-halogen battery comprises a casing, an anode positioned in the casing, the anode selected from the class consisting of sodium, sodium as an amalgam, and sodium in a nonaqueous electrolyte, a solid sodium ion-conductive electrolyte positioned in the casing adjacent the anode, and a cathode positioned adjacent the opposite side of the electrolyte, the cathode comprising a halogen selected from the class consisting of bromine, iodine, and mixtures thereof in a solvent of nitrobenzene.

These and various other objects, features and advantages of the invention will be better understood from the following description taken in connection with the accompanying drawing in which:

The single FIGURE is a sectional view of a battery made in accordance with our invention.

In the single FIGURE of the drawing, there is shown generally at 10 a sealed primary sodium-halogen battery embodying our invention which has a metallic casing 11 including an anode portion 12 and a cathode portion 13. An anode 14 of sodium is shown positioned within anode portion 12. A cathode 15 of bromine in nitrobenzene is shown positioned within cathode portion 13. A solid sodium ion-conductive electrolyte 16 is positioned between and adjacent anode 14 and cathode 15. Electrical leads (not shown) are affixed to the respective casing portions. Closed fill tubes 17 and 18 are associated with the respective portions 12 and 13. Electrolyte 16 is secured on opposite sides to portions 12 and 13 by identical glass seals 19.

We found that we could form a sealed primary sodium-bromine cell by providing a metallic casing, providing an anode within the casing, the anode selected from the class consisting of sodium, sodium as an amalgam, and sodium in a nonaqueous electrolyte, providing a solid sodium ion-conductive electrolyte adjacent the anode, and providing a cathode adjacent the opposite side of the electrolyte, the cathode comprising a halogen selected from the class consisting of bromine, iodine, and mixtures thereof in a solvent of nitrobenzene. Such batteries have open circuit voltages of from 3.1 to 3.5 volts.

As opposed to our earlier issued U.S. Pat. No. 3,793,080, the present invention employs a nonaqueous organic solvent of nitrobenzene. Our present cathode exhibits a lower pressure buildup resulting in an improved cell. The anode may consist of sodium or a sodium amalgam. The sodium amalgam can be in the range of compositions from about 95% sodium and 5% mercury by weight to about 35% sodium and 65% mercury. For the fully charged state of the cell, the amalgam composition is preferably high in sodium. Cells using sodium amalgams cannot be used efficiently at temperatures below 21.5°C due to complete freezing of the amalgam.

The cathode comprises a halogen selected from the class consisting of bromine, iodine, and mixtures thereof in a solvent of nitrobenzene. Electronically conductive material, such as a porous matrix of carbon felt or foam metal, small amounts of ionic salts, or both can be added to increase further the cell conductivity.

The nitrobenzene imparts salt solubility to the cathode. It is completely miscible with bromine, iodine and mixtures thereof. Nitrobenzene has a relatively high dielectric constant and a boiling point of 210°C. The vapor pressure of the halogen is considerably lower than that of the pure halogen thereby resulting in an improved cathode exhibiting lower pressures in the sealed cell at elevated temperatures.

We have found that the halogens or halogen mixtures in our cathode could be employed in a wide range of concentrations in the nitrobenzene. The range of concentrations for the halogen or halogen mixture is from 5.0 to 95.0 percent by weight. The nitrobenzene makes up the balance. In the charged state of the battery, the concentration of the halogen or halogen mixture is preferably near the high end of the range. As mentioned above, electronic conductive material, small amounts of ionic salts, or both may be added initially to improve cathode conductivity.

The anode casing portion can be made of suitable materials, such as nickel, Kovar alloy, niobium or tantalum, while the cathode casing portion can be made of suitable materials, such as, niobium or tantalum. These metals have been shown to be chemically stable in their respective environments.

One method of hermetically sealing the anode and cathode portions of the casing to opposite sides of the solid electrolyte is described and claimed in copending patent application Ser. No. 148,793, filed June 1, 1971, under the title "Method of Forming Metallic Battery Casing" in the name of Stephan P. Mitoff. This copending application is assigned to the same assignee as the present application.

In the above method, a disc of solid sodium ion-conductive electrolyte, for example, sodium beta-alumina, has stacked thereon a ring of General Electric Company 1,013 glass cut from tubing. The glass ring has approximately the inside and outside diameter of the cup lip of casing portion. On the glass ring is stacked the nickel anode portion in cup form with its lip adjacent the ring. The three components are positioned on a supporting jig and lowered into an inert atmosphere furnace at 1,000°C for about 1 minute. The resulting seal is helium leak-tight. The process is repeated to seal the cathode portion to the opposite surface of the solid electrolyte. Both anode and cathode portions can also be sealed simultaneously to the disc in the above manner. It will be appreciated that other battery configurations can be employed.

The anode portion is filled with sodium, sodium as an amalgam or sodium in a nonaqueous electrolyte through tube 17 after which the tube is sealed, as for example, by welding. The cathode portion is filled with bromine, iodine, or mixture thereof in a solvent of nitrobenzene conductive material, small amounts of ionic salts, or both can be added to increase further the cell conductivity. The resulting device is a sealed sodium-halogen cell. Leads (not shown) are attached to the respective casing portions for operation of the cell.

Examples of sealed primary sodium-halogen cells made in accordance with our invention are set forth below:

EXAMPLES 1-3

Three vented cells were constructed each of which employed a glass casing consisting of an anode portion and a cathode portion. A platinum wire extended into each casing portion. The portions were separated by a solid sodium beta-alumina electrolyte disc. The anode portions of all three cells were filled with a sodium amalgam of a composition of 90 weight percent of sodium and 10 weight percent of mercury. The cathode portion of cell 1 was filled with a liquid cathode of 95.0 weight percent bromine, 4.5 weight percent nitrobenzene, and 0.5 weight percent sodium bromide. The cathode portion of cell 2 was filled with a liquid cathode of 50.0 weight percent iodine, 49.0 weight percent nitrobenzene, and 1.0 weight percent sodium iodide. The cathode portion of the third cell was filled with 85.0 weight percent bromine, 9.0 weight percent iodine, 5.0 weight percent nitrobenzene, and 1.0 weight percent sodium bromide. The resulting devices were primary sodium-halogen batteries. Respective open circuit voltages 3.4, 3.1 and 3.5 volts were obtained.

EXAMPLE 4

The primary sodium-halogen cells 1, 2 and 3 of Example 1 exhibited at 25°C the following initial polarization behavior which is shown below in Table I.

TABLE I

| Cell 1 | |
|---|---|
| Cell Voltage-Volts | Current Density-ma/cm$^2$ |
| 3.4 | 0 |
| 2.3 | 0.45 |
| 2.1 | 0.75 |
| 1.6 | 1.5 |
| 0.6 | 3.0 |

| Cell 2 | |
|---|---|
| Cell Voltage-Volts | Current Density ma/cm$^2$ |
| 3.1 | 0 |
| 2.5 | 0.3 |
| 2.4 | 0.45 |
| 1.73 | 1.5 |
| 0.93 | 3.0 |

Table I—Continued

| Cell 3 | |
|---|---|
| Cell Voltage-Volts | Current Density ma/cm$^2$ |
| 3.5 | 0 |
| 2.53 | 0.75 |
| 2.1 | 1.5 |
| 1.2 | 3.0 |

EXAMPLE 5

Cell 3 of Example 1 was discharged at a current density of 0.15 ma/cm$^2$ for several days at a discharge voltage between 2.8 and 3.0 volts.

While other modifications of the invention and variations thereof which may be employed within the scope of the invention have not been described, the invention is intended to include such as may be embraced within the following claims.

What we claim as new and desire to secure by Letters Patent of the United States is:

1. A sealed primary sodium-halogen cell comprising a casing, an anode positioned in the casing, the anode selected from the class consisting of sodium, sodium as an amalgam, and sodium in a nonaqueous electrolyte, a solid sodium beta-alumina ion-conductive electrolyte positioned in the casing adjacent the anode, and a cathode positioned adjacent the opposite side of the electrolyte, the cathode comprising from 5.0 weight percent to 95.0 weight percent of a halogen selected from the class consisting of bromine, iodine, and mixtures thereof in nitrobenzene as a solvent.

2. A sealed primary sodium-halogen battery as in claim 1, in which the cathode contains a small amount of an ionic salt.

3. A sealed primary sodium-halogen battery as in claim 1, in which the cathode contains an electronically conductive material.

4. A sealed primary sodium-halogen battery as in claim 1, in which the cathode contains bromine and from 0.01 to 1.5 weight percent of sodium bromide.

5. A sealed primary sodium-halogen battery as in claim 1, in which the cathode contains iodine and from 0.01 to 5.0 weight percent of sodium iodide.

6. A sealed primary sodium-halogen battery as in claim 1, in which the cathode contains bromine and iodine, and from 0.5 to 1.0 weight percent of sodium bromide.

* * * * *